(12) United States Patent
Jung

(10) Patent No.: US 11,327,902 B2
(45) Date of Patent: May 10, 2022

(54) MEMORY SYSTEM, MEMORY CONTROLLER, AND OPERATION METHOD OF MEMORY SYSTEM FOR SETTING LOCK ON MAP SEGMENTS CACHED IN MAP CACHE

(71) Applicant: SK hynix Inc., Gyeonggi-do (KR)

(72) Inventor: In Jung, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/011,300

(22) Filed: Sep. 3, 2020

(65) Prior Publication Data

US 2021/0334009 A1  Oct. 28, 2021

(30) Foreign Application Priority Data

Apr. 22, 2020 (KR) .................. 10-2020-0048389

(51) Int. Cl.
 *G06F 12/126* (2016.01)
 *G06F 12/0866* (2016.01)
(52) U.S. Cl.
 CPC ........ *G06F 12/126* (2013.01); *G06F 12/0866* (2013.01); *G06F 2212/7201* (2013.01)
(58) Field of Classification Search
 CPC ........... G06F 2212/7201; G06F 12/126; G06F 12/0866
 See application file for complete search history.

(56) References Cited

U.S. PATENT DOCUMENTS

| 6,438,130 | B1 * | 8/2002 | Kagan .................. H04L 49/351 370/392 |
| 9,652,270 | B2 | 5/2017 | Komarov et al. |
| 2002/0055972 | A1 * | 5/2002 | Weinman, Jr. ...... G06F 11/2071 709/203 |
| 2004/0268071 | A1 * | 12/2004 | Khan .................... G06F 12/126 711/163 |
| 2010/0332730 | A1 * | 12/2010 | Royer, Jr. ........... G06F 12/0246 711/103 |
| 2019/0087345 | A1 * | 3/2019 | Hijaz ..................... G06F 11/34 |

FOREIGN PATENT DOCUMENTS

| KR | 10-1993-0022209 | 11/1993 |
| KR | 10-2001-0067820 | 7/2001 |

* cited by examiner

*Primary Examiner* — Chie Yew
(74) *Attorney, Agent, or Firm* — IP & T Group LLP

(57) ABSTRACT

The present disclosure includes a memory system, a memory controller, and an operation method thereof. The memory system may cache a subset of all map segments in a mapping table indicating mapping information between logical addresses and physical addresses in a map cache, may select map segments on which locking is to be set from the map segments cached in the map cache so as not to be evicted from the map cache based on information on all commands received from a host during a set period of time, and may set lock flags for the map segments on which locking is to be set. Accordingly, the memory system may reduce the overhead occurring in reloading previously evicted map segments in the process of updating a mapping table, and may optimize update performance for a mapping table within a limit that guarantees caching performance to a predetermined level or higher.

17 Claims, 15 Drawing Sheets

MEMORY SYSTEM, MEMORY CONTROLLER, AND OPERATION METHOD OF MEMORY SYSTEM FOR SETTING LOCK ON MAP SEGMENTS CACHED IN MAP CACHE

CROSS REFERENCE TO RELATED APPLICATION

The present application claims priority under 35 U.S.C. 119(a) to Korean patent application number 10-2020-0048389, filed on Apr. 22, 2020, which is incorporated herein by reference in its entirety.

BACKGROUND

1. Field

Embodiments of the present disclosure relate to a memory system, a memory controller, and an operation method of a memory system.

2. Description of the Prior Art

A memory system, e.g., a storage device stores data on the basis of a request from a host, such as a computer, a mobile terminal (for example, a smartphone or a tablet), or any of various other electronic devices. The memory system may be a type of device that stores data in a magnetic disk such as a hard disk drive (HDD), or a type of device that stores data in a nonvolatile memory such as a solid state drive (SSD), a universal flash storage device (UFS), or an embedded MMC (eMMC) device.

The memory system may further include a memory controller for controlling the memory device. The memory controller may receive a command input from the host and on the basis of the received command, may execute or control operations for reading, writing, or erasing data in a volatile memory or a nonvolatile memory included in the memory system. The memory controller may drive firmware for performing a logical operation for executing or controlling such operations.

The memory system uses a mapping table for managing mapping information between a logical address of the memory requested from a host and a physical address of the memory device when performing a read or write operation on the basis of a command received from the host. The memory system may cache map segments, which are parts of the mapping table, in a map cache area in order to quickly retrieve mapping information from the mapping table. A cached map segment may be evicted from the map cache area if the map segment satisfies a specific condition (e.g., LRU).

SUMMARY

Embodiments of the present disclosure may provide a memory system, a memory controller, and an operation method of a memory system capable of reducing the overhead occurring in reloading a previously evicted map segment in the process of updating a mapping table.

In addition, embodiments of the present disclosure may provide a memory system, a memory controller, and an operation method of a memory system capable of optimizing update performance for a mapping table within a limit that guarantees caching performance to a predetermined level or higher.

In an aspect, embodiments of the present disclosure may provide a memory system including a memory device and a memory controller coupled to the memory device.

The memory controller may cache a subset of all map segments in a mapping table indicating mapping information between logical addresses and physical addresses in a map cache.

In addition, the memory controller may select map segments on which locking is to be set from the map segments cached in the map cache so as not to be evicted from the map cache based on information on all commands received from a host during a set period of time.

In addition, the memory controller may set lock flags for the map segments on which locking is to be set.

For example, when a ratio of write commands to all commands received from the host during the set period of time is greater than or equal to a threshold ratio, the memory controller may select the map segments on which locking is to be set from the map segments in the map cache.

On the other hand, when the ratio of write commands to all commands received from the host during the set period of time is less than a threshold ratio, the memory controller may select the map segments on which locking is to be set from the map segments in the map cache based on logical addresses referenced by read commands received from the host during the set period of time.

For example, 1) when consecutive logical addresses are sequentially referenced a threshold count or more by the read commands, or 2) when logical addresses in the same map segment, among the map segments in the map cache, are referenced a threshold reference number of times or more by the read commands, the memory controller may select the map segments on which locking is to be set from the map segments in the map cache.

As another example, when a hit ratio of the map cache by the read commands is greater than or equal to a threshold hit ratio, the memory controller may select the map segments on which locking is to be set from the subset of map segments in the map cache.

The memory controller may select up to N least recently used map segments from the map segments in the map cache as the map segments on which locking is to be set. Here, N is a natural number.

Meanwhile, the value N may be changed depending on a hit ratio and a reference hit ratio of the map cache. In addition, the reference hit ratio may be changed in proportion to the number of map segments on which locking is set, among the map segments in the map cache.

The memory controller may reset the lock flags after updating the mapping table with the map segments on which locking is set, among the map segments in the map cache.

In another aspect, embodiments of the present disclosure may provide a memory controller including a memory interface configured to communicate with a memory device and a control circuit coupled to the memory device.

The control circuit may cache a subset of all map segments in a mapping table indicating mapping information between logical addresses and physical addresses in a map cache.

In addition, the control circuit may select map segments on which locking is to be set from the map segments cached in the map cache so as not to be evicted from the map cache based on information on all commands received from a host during a set period of time.

The control circuit may set lock flags for the map segments on which locking is to be set.

For example, when a ratio of write commands to all commands received from the host during the set period of time is greater than or equal to a threshold ratio, the control circuit may select the map segments on which locking is to be set from the subset of map segments in the map cache.

Meanwhile, when the ratio of write commands to all commands received from the host during the set period of time is less than a threshold ratio, the control circuit may select the map segments on which locking is to be set from the subset of map segments in the map cache based on logical addresses referenced by read commands received from the host during the set period of time.

For example, 1) when consecutive logical addresses are sequentially referenced a threshold count or more by the read commands, or 2) when logical addresses in the same map segment, among the map segments in the map cache, are referenced a threshold reference number of times or more by the read commands, the control circuit may select the map segments on which locking is to be set from the map segments in the map cache.

As another example, when a hit ratio of the map cache by the read commands is greater than or equal to a threshold hit ratio, the control circuit may select the set map segments from the subset of map segments in the map cache.

The control circuit may select up to N least recently used map segments from the map segments in the map cache as the map segments on which locking is to be set. Here, N is a natural number.

Meanwhile, the value N may be changed depending on a hit ratio and a reference hit ratio of the map cache. In addition, the reference hit ratio may be changed in proportion to the number of map segments on which locking is set, among the subset of map segments cached in the map cache.

The control circuit may reset the lock flags after updating the mapping table with the map segments on which locking is set, among the subset of map segments in the map cache.

An operation method of a memory system may include caching a subset of map segments in a mapping table indicating mapping information between logical addresses and physical addresses in a map cache.

In addition, the operation method of a memory system may include selecting map segments on which locking is to be set from the map segments cached in the map cache based on information on all commands received from a host during a set period of time.

For example, the selecting map segments on which locking is to be set may include, when a ratio of write commands to all commands is greater than or equal to a threshold ratio, selecting the map segment on which locking is to be set from the map segments in the map cache.

As another example, the selecting map segments on which locking is to be set may include, when the ratio of write commands to all commands is less than a threshold ratio, selecting the map segments on which locking is to be set from the map segments in the map cache on the basis of logical addresses referenced by read commands received from the host during a unit time.

In this case, the selecting map segments on which locking is to be set may include, 1) when consecutive logical addresses are sequentially referenced by a threshold count or more the read commands, or 2) when logical addresses in the same map segment, among the map segments in the map cache, are referenced a threshold reference number of times or more by the read commands, selecting the map segments on which locking is to be set from the map segments in the map cache. Meanwhile, the selecting map segments on which locking is to be set may include, when a hit ratio of the map cache by the read commands is greater than or equal to a threshold hit ratio, selecting the map segments on which locking is to be set from the map segments in the map cache.

In another aspect, embodiments of the present disclosure may provide a memory system including a memory device including a plurality of memory blocks and a controller including a mapping table, which stores multiple map segments indicating mapping between logical addresses and physical addresses for the memory blocks.

The controller may cache a subset of map segments in a map cache.

The controller may select map segments among the cached map segments based on types of all commands received from a host during a set period of time and the ratio of a read command or a write command among all commands received during the set period of time.

The controller may lock the selected map segments so as not to be evicted from the map cache.

The controller may use the locking map segments to update the mapping table.

In addition, the operation method of a memory system may include setting lock flags for the map segments on which locking is to be set.

According to embodiments of the present disclosure, it is possible to reduce the overhead occurring in reloading a previously evicted map segment in the process of updating a mapping table.

In addition, according to embodiments of the present disclosure, it is possible to optimize update performance for a mapping table within a limit that guarantees caching performance to a predetermined level or higher.

BRIEF DESCRIPTION OF THE DRAWINGS

The above and other aspects, features, and advantages of the present disclosure will become more apparent from the following detailed description taken in conjunction with the accompanying drawings, in which.

DETAILED DESCRIPTION

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s).

Figure 1:
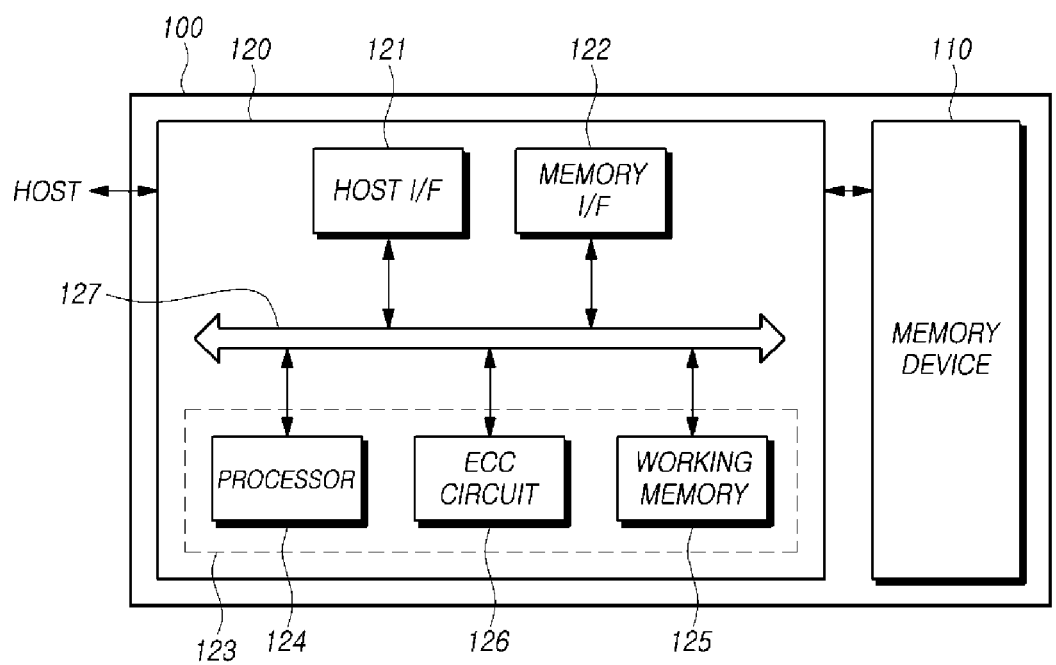
FIG. 1 is a schematic diagram illustrating a configuration of a memory system according to an embodiment of the present disclosure.

FIG. 1 is a schematic diagram illustrating a configuration of a memory system 100 according to an embodiment of the present disclosure.

Referring to FIG. 1, the memory system 100 may include a memory device 110 configured to store data, and a memory controller 120 configured to control the memory device 110.

The memory device 110 may include multiple memory blocks. The memory device 110 may be configured to operate in response to control signals received from the memory controller 120. Operations of the memory device 110 may include, for example, a read operation, a program operation (also referred to as a "write operation") and an erase operation.

The memory device 110 may include a memory cell array including multiple memory cells (also simply referred to as "cells") configured to store data. The memory cell array may exist inside a memory block.

For example, the memory device 110 may be implemented by any of various types of memories, such as a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory, a resistive random access memory (RRAM), a phase-change memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Embodiments of the present disclosure are applicable not only to a flash memory device having an electric charge storage layer configured as a conductive floating gate, but also to a flash memory device having a charge trap flash (CTF) having an electric charge storage layer configured as an insulating film.

The memory device 110 may be configured to receive a command and an address from the memory controller 120 and to access an area of the memory cell array, which is selected by the address. That is, the memory device 110 may perform an operation corresponding to the received command in a memory area of the memory device having a physical address corresponding to the received address from the controller.

For example, the memory device 110 may perform a program operation, a read operation and an erase operation. During the program operation, the memory device 110 may program data in the area selected by the address. During the read operation, the memory device 110 may read data from the area selected by the address. During the erase operation, the memory device 110 may erase data stored in the area selected by the address.

The memory controller 120 may control write (or program), read, erase, and background operations with regard to the memory device 110. The background operation may include, for example, a garbage collection operation (GC), a wear leveling (WL) operation, and/or a bad block management (BBM) operation.

The memory controller 120 may control the operation of the memory device 110 at the request of a host. Alternatively, the memory controller 120 may control the operation of the memory device 110 without a corresponding request of the host, such as, for example, when it performs one or more background operations of the memory device 110.

The memory controller 120 and the host may be separate devices. In another embodiment, the memory controller 120 and the host may be integrated and implemented as a single device. In the following description, the memory controller 120 and the host are separate devices.

In FIG. 1, the memory controller 120 may include a host interface (I/F) 121, a memory interface 122 and a control circuit 123.

The host interface 121 may be configured to provide an interface for communication with the host.

When receiving a command from the host (HOST), the control circuit 123 may receive the command through the host interface 121 and may perform an operation of processing the received command.

The memory interface 122 may be connected to the memory device 110 to provide an interface for communication with the memory device 110. That is, the memory interface 122 may be configured to provide the memory device 110 and the memory controller 120 with an interface in response to a control of the control circuit 123.

The control circuit 123 may be configured to control operation of the memory device 110 by exercising overall control of the memory controller 120. For example, the control circuit 123 may include a processor 124 and a working memory 125. The control circuit 123 may further include an error detection and correction circuit (i.e., ECC circuit) 126.

The processor 124 may control overall operation of the memory controller 120. The processor 124 may perform a logical operation. The processor 124 may communicate with the host through the host interface 121. The processor 124 may communicate with the memory device 110 through the memory interface 122.

The processor 124 may perform a function of a flash translation layer (FTL). The processor 124 may translate a logical block address (LBA) provided by the host into a physical block address (PBA) through the FTL. The FTL may receive the LBA and translate the LBA into the PBA using a mapping table.

There are various address mapping methods which may be employed by the FTL, according to the mapping unit. Typical address mapping methods include a page mapping method, a block mapping method, and a hybrid mapping method.

The processor 124 may be configured to randomize data received from the host. For example, the processor 124 may randomize data received from the host using a randomizing seed. The randomized data is provided to the memory device 110 as data to be stored, and is programmed in the memory cell array.

The processor 124 may be configured to derandomize data received from the memory device 110 during a read operation. For example, the processor 124 may derandomize data received from the memory device 110 using a derandomizing seed. The derandomized data may be output to the host.

The processor 124 may execute firmware (FW) so as to control the operation of the memory controller 120. In other words, the processor 124 may control overall operation of the memory controller 120 and, in order to perform a logical operation, may execute (or drive) firmware loaded into the working memory 125 during booting.

The firmware refers to a program executed inside the memory system 100, and may include various functional layers.

For example, the firmware may include a flash translation layer (FTL), a host interface layer (HIL) and/or a flash interface layer (FIL). As mentioned above, the FTL is configured to translate between a logical address received from the host and a physical address of the memory device 110. The HIL is configured to interpret a command that the host issues to the memory system 100 (or storage device) and to deliver the same to the FTL. The FIL is configured to deliver a command issued by the FTL to the memory device 110.

For example, the firmware may be stored in the memory device 110, then loaded into the working memory 125.

The working memory 125 may store firmware, program codes, commands, or pieces of data necessary to drive the memory controller 120. The working memory 125 may include, for example, a static RAM (SRAM), a dynamic RAM (DRAM), and/or a synchronous RAM (SDRAM) as a volatile memory.

The error detection/correction circuit 126 may be configured to detect one or more error bits of target data using an error correction code, and to correct the detected error bit(s). For example, the target data may be data stored in the working memory 125, data retrieved from the memory device 110, or the like.

The error detection/correction circuit 126 may be implemented to decode data using the error correction code. The error detection/correction circuit 126 may be implemented using various code decoders. For example, the error detection/correction circuit 126 may be implemented with a decoder that performs nonsystematic code decoding or a decoder that performs systematic code decoding.

For example, the error detection/correction circuit 126 may detect error bit(s), sector by sector, with regard to each piece of read data. That is, each piece of read data may include multiple sectors. As used herein, a sector may refer to a data unit smaller than the read unit (i.e., page) of a flash memory. Sectors constituting each piece of read data may correspond to each other via an address.

The error detection/correction circuit 126 may calculate a bit error rate (BER) and determine whether or not correction can be made sector by sector. For example, if the BER is higher than a reference value, the error detection/correction circuit 126 may determine that the corresponding sector is uncorrectable or "a fail". If the BER is lower than the reference value, the error detection/correction circuit 126 may determine that the corresponding sector is correctable or "a pass".

The error detection/correction circuit 126 may perform error detection and correction operations successively with regard to all pieces of read data. When a sector in the read data is correctable, the error detection/correction circuit 126 may omit the error detection and correction operations related to the corresponding sector with regard to the next piece of read data. After finishing error detection and correction operations with regard to all pieces of read data in this manner, the error detection/correction circuit 126 may detect a sector deemed uncorrectable to the end. There may be one or more sectors deemed uncorrectable. The error detection/correction circuit 126 may deliver information (for example, address information) regarding the sectors deemed uncorrectable to the processor 124.

The bus 127 may be configured to provide a channel between the constituent elements 121, 122, 124, 125, and 126 of the memory controller 120. The bus 127 may include, for example, a control bus for delivering various kinds of control signals and commands, and a data bus for delivering various kinds of data.

The above-mentioned constituent elements 121, 122, 124, 125, and 126 of the memory controller 120 are only provided as examples. One or more of these elements may be omitted, and/or one or more of these elements may be integrated into a single element. Of course, as those skilled in the art will understand, the memory controller 120 may also contain one or more other elements in addition to the elements identified above.

Hereinafter, the memory device 110 is described in more detail with reference to FIG. 2.

Figure 2:
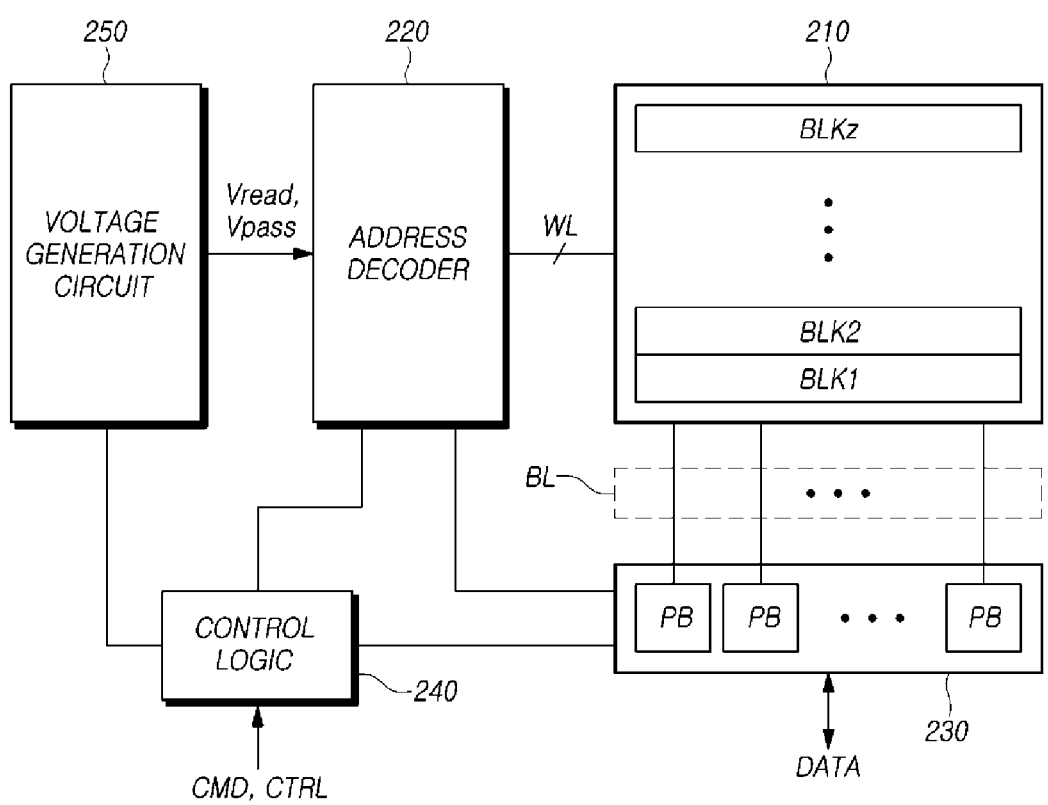
FIG. 2 is a block diagram schematically illustrating a memory device according to an embodiment of the present disclosure.

FIG. 2 is a block diagram schematically illustrating a memory device 110 according to an embodiment of the present disclosure.

Referring to FIG. 2, the memory device 110 may include a memory cell array 210, an address decoder 220, a read/write circuit 230, a control logic 240, and a voltage generation circuit 250.

The memory cell array 210 may include multiple memory blocks BLK1-BLKz (where z is a natural number greater than or equal to 2).

In the multiple memory blocks BLK1-BLKz, multiple word lines WL and multiple bit lines BL may be disposed, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells, and may include nonvolatile memory cells having a vertical channel structure.

The memory cell array 210 may be configured as a memory cell array having a two-dimensional structure and, in some cases, may be configured as a memory cell array having a three-dimensional structure.

Each of the multiple memory cells in the memory cell array 210 may store at least one bit of data. For example, each of the multiple memory cells may be a single-level cell (SLC) configured to store one bit of data, a multi-level cell (MLC) configured to store two bits of data, a triple-level cell (TLC) configured to store three bits of data, or a quad-level cell (QLC) configured to store four bits of data. As another example, the memory cell array 210 may include multiple memory cells, each of which may be configured to store five or more bits of data.

In FIG. 2, the address decoder 220, the read/write circuit 230, the control logic 240, and the voltage generation circuit 250 may operate as a peripheral circuit configured to drive the memory cell array 210.

The address decoder 220 may be connected to the memory cell array 210 through the multiple word lines WL.

The address decoder 220 may be configured to operate in response to a control of the control logic 240.

The address decoder 220 may receive addresses through an input/output buffer (not shown) inside the memory device 110. The address decoder 220 may be configured to decode a block address among the received addresses. The address decoder 220 may select at least one memory block according to the decoded block address.

The address decoder 220 may receive a read voltage Vread and a pass voltage Vpass from the voltage generation circuit 250.

During a read operation, the address decoder 220 may apply the read voltage Vread to a selected word line WL inside a selected memory block and may apply the pass voltage Vpass to the remaining non-selected word lines WL.

During a program verification operation, the address decoder 220 may apply a verification voltage generated by the voltage generation circuit 250 to a selected word line WL inside a selected memory block and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line according to the block address and the row address. The column address may be decoded by the address decoder 220 and provided to the read/write circuit 230.

The address decoder 220 may include a block decoder, a row decoder, a column decoder, and/or an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The read/write circuit 230 is also referred to as a page buffer circuit including multiple page buffers PB, or a data register circuit. The read/write circuit 230 may include a data buffer that participates in a data processing function and, in some cases, may further include a cache buffer that operates in a caching function.

The multiple page buffers PB may be connected to the memory cell array 210 through the multiple bit lines BL. In order to sense the threshold voltage Vth of the memory cells during a read operation and a program verification operation, the multiple page buffers PB may continuously supply a sensing current to the bit lines BL connected to the memory cells, may sense, through a sensing node, a change in the amount of current that flows according to the program state of a corresponding memory cell, and may latch the same as sensing data.

The read/write circuit 230 may operate in response to page buffer control signals output from the control logic 240.

During a read operation, the read/write circuit 230 senses data in a memory cell, temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control overall operation of the memory device 110 in response to the control signal CTRL. The control logic 240 may output a control signal for adjusting the pre-charge potential level of sensing nodes of multiple page buffers PB.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

Figure 3:
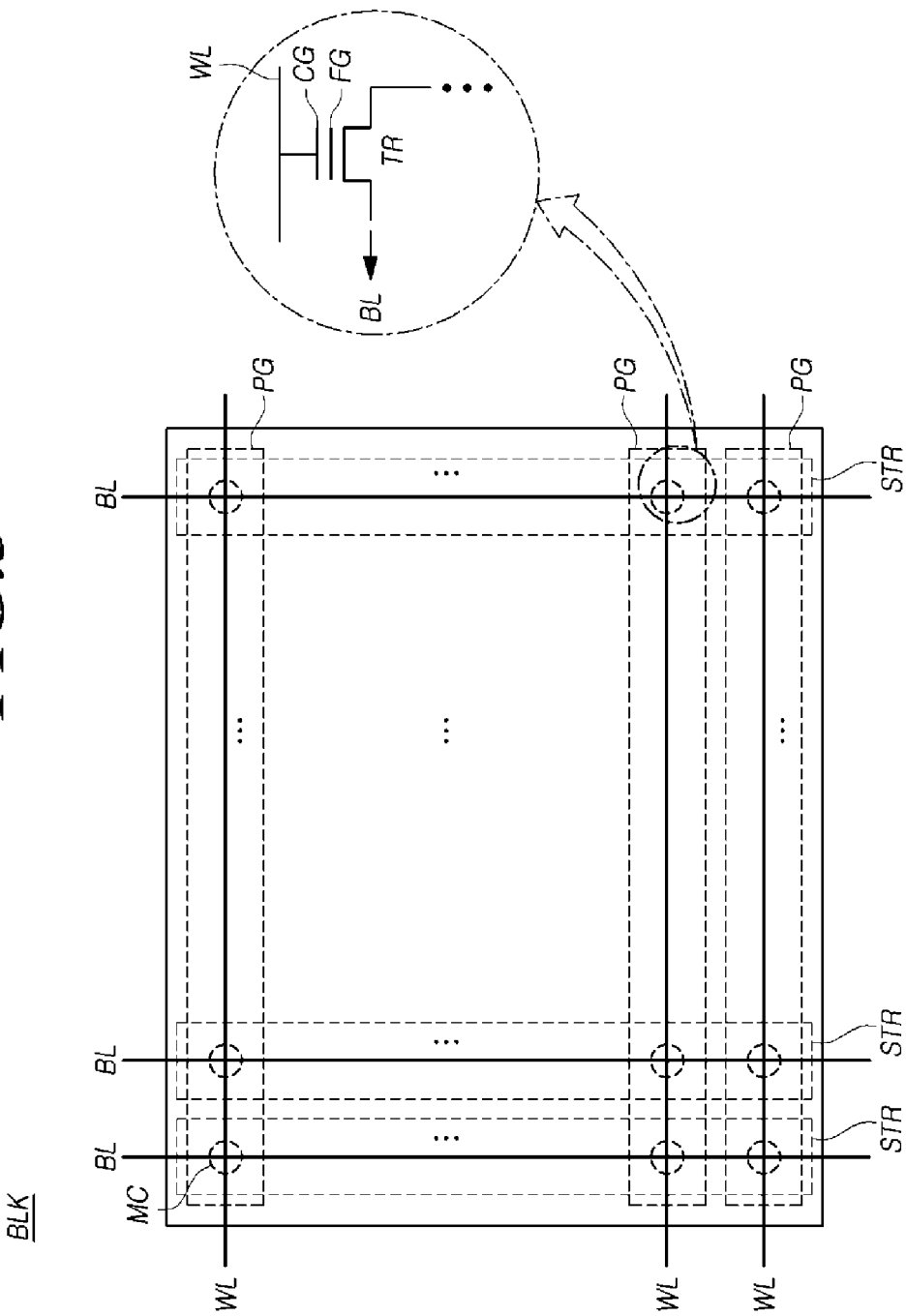
FIG. 3 is a diagram schematically illustrating a memory block of a memory device according to an embodiment of the present disclosure.

FIG. 3 is a diagram schematically illustrating a memory block BLK of a memory device 110 according to an embodiment of the present disclosure.

Referring to FIG. 3, the memory block BLK may be arranged and configured in such direction that multiple pages PG and multiple strings STR intersect.

The multiple pages PG correspond to multiple word lines WL, and the multiple strings STR correspond to multiple bit lines BL.

In the memory block BLK, multiple word lines WL and multiple bit lines BL may be arranged to intersect. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

The multiple word lines WL and the multiple bit lines BL may intersect with each other, thereby defining multiple memory cells MC. Each memory cell MC may have a transistor TR arranged therein.

For example, the transistor TR may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some cases, at least one dummy word line may be additionally arranged between the first outermost word line and the first selection line. In addition, dummy word line(s) may be additionally arranged between the second outermost word line and the second selection line.

In the case of a memory block structure as illustrated in FIG. 3., a read operation and a program operation (i.e., write operation) may be performed page by page, and an erase operation may be performed memory block by memory block.

Figure 4:
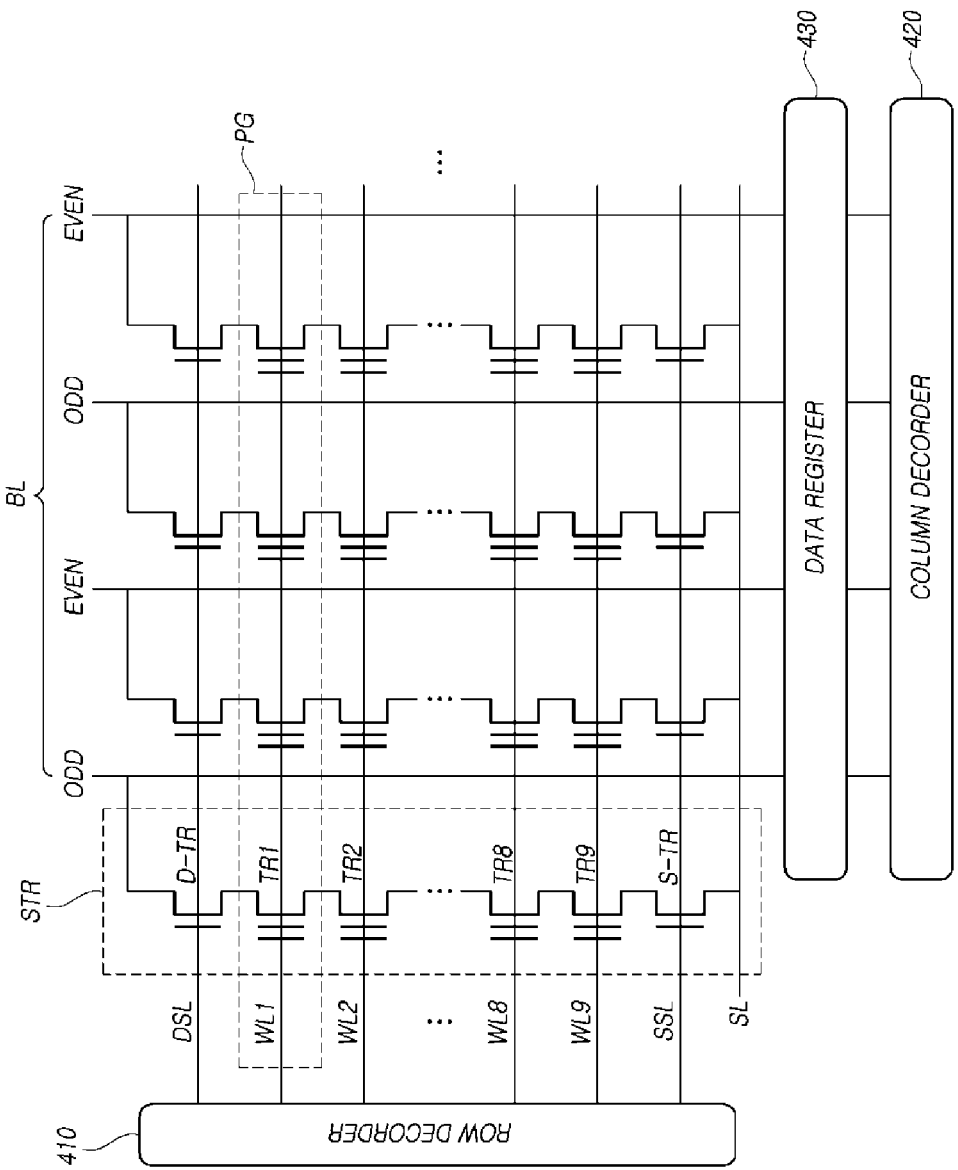
FIG. 4 is a diagram illustrating the structure of word lines and bit lines of a memory device according to an embodiment of the present disclosure.

FIG. 4 is a diagram illustrating a structure of word lines WL and bit lines BL of a memory device 110 according to an embodiment of the present disclosure.

Referring to FIG. 4, the memory device 110 has a core area in which memory cells MC are concentrated, and an auxiliary area which corresponds to the remaining non-core area. The auxiliary area supports the operations of the memory cell array 210.

The core area may include pages PG and strings STR. In the core area, multiple word lines WL1-WL9 and multiple bit lines BL are arranged to intersect.

The word lines WL1-WL9 may be connected to a row decoder 410. The bit lines BL may be connected to a column decoder 420. A data register 430, which corresponds to the read/write circuit 230 of FIG. 2, may exist between the multiple bit lines BL and the column decoder 420.

The multiple word lines WL1-WL9 may correspond to multiple pages PG.

For example, each of the multiple word lines WL1-WL9 may correspond to one page PG as illustrated in FIG. 4. In contrast, when each of the multiple word lines WL1-WL9 has a large size, each of the multiple word lines WL1-WL9 may correspond to at least two (for example, two or four) pages PG. Each page PG is the smallest unit in connection with conducting a program operation and a read operation, and all memory cells MC within the same page PG may perform simultaneous operations when conducting a program operation and a read operation.

The multiple bit lines BL, which may include alternating odd- and even-numbered bit lines, may be connected to the column decoder 420.

For accessing a memory cell MC, the address may be input to the core area first through the input/output end and then through the row decoder 410 and the column decoder 420 such that a corresponding target memory cell can be designated. As used herein, designating a target memory cell refers to accessing one of the memory cells MC at the sites of intersection between the word lines WL1-WL9 connected to the row decoder 410 and the bit lines BL connected to the column decoder 420, for programming data therein or for reading programmed data therefrom.

Pages PG in a first direction (for example, X-axis direction) are bound by a commonly used line referred to as a word line WL, and strings STR in a second direction (for example, Y-axis direction) are bound (connected) by a common line referred to as a bit line BL. As used herein, being commonly bound refers to being structurally connected by the same material and simultaneously receiving the same voltage during voltage application. The voltage applied to a memory cell MC among memory cells MC connected in series may slightly differ from the voltage applied to another memory cell MC further down the line, due to the voltage drop across the preceding memory cell MC.

The data register 430 plays an important role because all data processing by the memory device 110, including program and read operations, occurs via the data register 430. If data processing by the data register 430 is delayed, all the other areas need to wait until the data register 430 finishes the data processing. In addition, degradation of performance of the data register 430 may degrade the overall performance of the memory device 110.

In the example illustrated in FIG. 4, in one string STR, multiple transistors TR1-TR9 connected to multiple word lines WL1-WL9 may exist. The areas in which the multiple transistor TR1-TR9 exist correspond to memory cells MC. As used herein, the multiple transistors TR1-TR9 refer to transistors including control gates CG and floating gates FG.

The multiple word lines WL1-WL9 include two outermost word lines WL1 and WL9. A first selection line DSL may be additionally arranged outside the first outermost word line WL1, which is closer to the data register 430 in terms of the signal path among the two outermost word lines WL1 and WL9, and a second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR plays the role of a switch that turns on or off the connection between the corresponding string STR and the data register 430. The second selection transistor S-TR plays the role of a switch that turns on or off the connection between the corresponding string STR and the source line SL. That is, the first selection transistor D-TR and the second selection transistor S-TR play the role of gatekeepers which are positioned at opposite ends of the corresponding string STR and deliver/block signals.

The memory system 100 needs to fill the target memory cell MC of the bit line BL to be programmed with electrons during a program operation. Accordingly, the memory system 100 applies a turn-on voltage Vcc to the gate electrode of the first selection transistor D-TR, thereby turning on the first selection transistor D-TR, and applies a turn-off voltage (for example, 0V) to the gate electrode of the second selection transistor S-TR, thereby turning off the second selection transistor S-TR.

The memory system 100 turns on both the first selection transistor D-TR and the second selection transistor S-TR during a read operation or a verification operation. Accordingly, an electric current may flow through the corresponding string STR and drain to the source line SL, which corresponds to the ground, such that the voltage level of the bit line BL can be measured. However, during a read operation, there may be a time difference in on/off timing between the first selection transistor D-TR and the second selection transistor S-TR.

The memory system 100 may supply a voltage (for example, +20V) to the substrate through a source line SL during an erase operation. The memory system 100 floats both the first selection transistor D-TR and the second selection transistor S-TR during an erase operation, thereby generating an infinite resistance. As a result, the role of the first selection transistor D-TR and that of the second selection transistor S-TR may be removed, and electrons may operate only between the floating gate FG and the substrate due to the potential difference.

Figure 5:
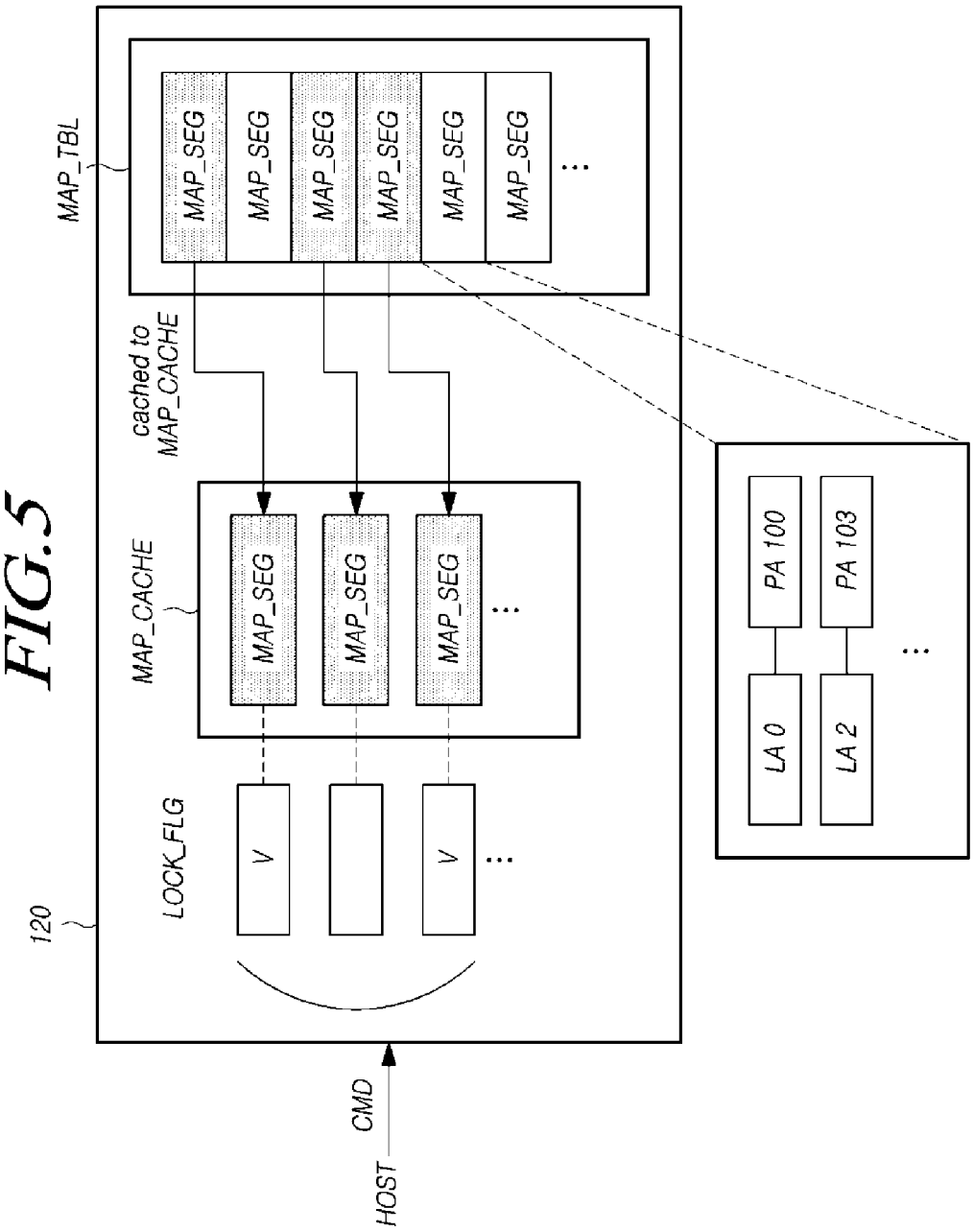
FIG. 5 is a diagram schematically illustrating operation of a memory system according to an embodiment of the present disclosure.

FIG. 5 is a diagram schematically illustrating operation of the memory system 100 of FIG. 1 according to an embodiment of the present disclosure.

Referring to FIG. 5, the memory controller 120 of the memory system 100 may cache a subset of map segments MAP_SEG in a mapping table MAP_TBL that indicates mapping information between logical addresses and physical addresses in a map cache MAP_CACHE.

The mapping table MAP_TBL may reside on the working memory 125 of the memory controller 120. The mapping table MAP_TBL may be loaded from the memory device 110 when the memory system 100 is booted.

In addition, the map cache MAP_CACHE may reside on the working memory 125 of the memory controller 120, like the mapping table MAP_TBL. Alternatively, the map cache MAP_CACHE may reside on volatile memory (e.g., TCM, SRAM, DRAM, or SDRAM) that is different from the working memory 125.

The mapping table MAP_TBL may include a plurality of map segments MAP_SEG, each of which may include a plurality of pieces of mapping information. Each piece of mapping information may indicate a specific physical address PA mapped to a specific logical address LA. In the illustrated example, the mapping information may indicate that a logical address LA 0 and a physical address PA 100 are mapped to each other. As another example, the mapping information may indicate that a logical address LA 2 and a physical address PA 103 are mapped to each other.

The mapping information in the map segment MAP_SEG cached in the map cache MAP_CACHE may be changed by a program/erase operation, a background operation (e.g., garbage collection), or the like. The memory controller 120 may update the mapping table MAP_TBL in order to reflect changes in the map segments MAP_SEG, which are cached in the map cache MAP_CACHE, on the mapping table MAP_TBL.

The memory controller 120 may select map segments on which locking is to be set from the map segments MAP_SEG cached in the map cache MAP_CACHE on the basis of information on a command received from a host (HOST) during a set period of time (e.g., 100 ms). The memory controller 120 may perform control so as to prevent the map segments on which locking is set from being evicted from the map cache MAP_CACHE, regardless of an eviction policy applied to the map cache MAP_CACHE. In this case, the memory controller 120 may set the period of time to any suitable length of time.

The reason why the memory controller 120 selects and locks certain map segments from the map segments MAP_SEG cached in the map cache MAP_CACHE is to reduce the overhead of reloading the map segments that have already been evicted in the process of updating the mapping table MAP_TBL.

In order to update the mapping table MAP_TBL, a map segment MAP_SEG in which mapping information has been changed must be preferentially loaded to the map cache MAP_CACHE. If a map segment MAP_SEG in which mapping information has been changed is cached in the map cache MAP_CACHE, the memory controller 120 may immediately update the mapping table MAP_TBL using the map segment.

On the other hand, a map segment MAP_SEG in which mapping information has been changed may be evicted from the map cache MAP_CACHE, instead of being cached therein. For example, data corresponding to the logical address in a map segment MAP_SEG that has been evicted may be written to an open block of the memory device 110. In this case, the memory controller 120 must load the evicted map segment MAP_SEG again in order to update the mapping table MAP_TBL.

Accordingly, in order to prevent a map segment MAP_SEG used to update the mapping table MAP_TBL from being evicted from the map cache MAP_CACHE, the memory controller 120 sets locking on, i.e., locks, the map segment MAP_SEG that is used to update the mapping table MAP_TBL.

To indicate that locking is set on the map segment MAP_SEG, the memory controller 120 may set a lock flag LOCK_FLG for that map segment MAP_SEG. "Setting a lock flag LOCK_FLG" corresponding to the map segment MAP_SEG (e.g., marked by "V") means that locking is set on the corresponding map segment MAP_SEG. On the other hand, "resetting a lock flag LOCK_FLG" corresponding to the map segment MAP_SEG (e.g., not marked by "V") means that locking is not set on the corresponding map segment.

The memory controller 120 may manage the lock flag LOCK_FLG using any of various data structures.

For example, the memory controller 120 may manage the lock flag LOCK_FLG in bitmaps. In this case, the value of each bit in the bitmap may indicate whether locking is set on the map segment MAP_SEG corresponding to that bit or the lock thereof is reset.

For example, value "1" of a bit in the bitmap may indicate that locking is set on a corresponding map segment, and value "0" thereof may indicate that the locking of the corresponding map segment is reset. On the other hand, value "0" of a bit in the bitmap may indicate that locking is set on a corresponding map segment, and value "1" thereof may indicate that the locking of the corresponding map segment is reset.

Figure 6:
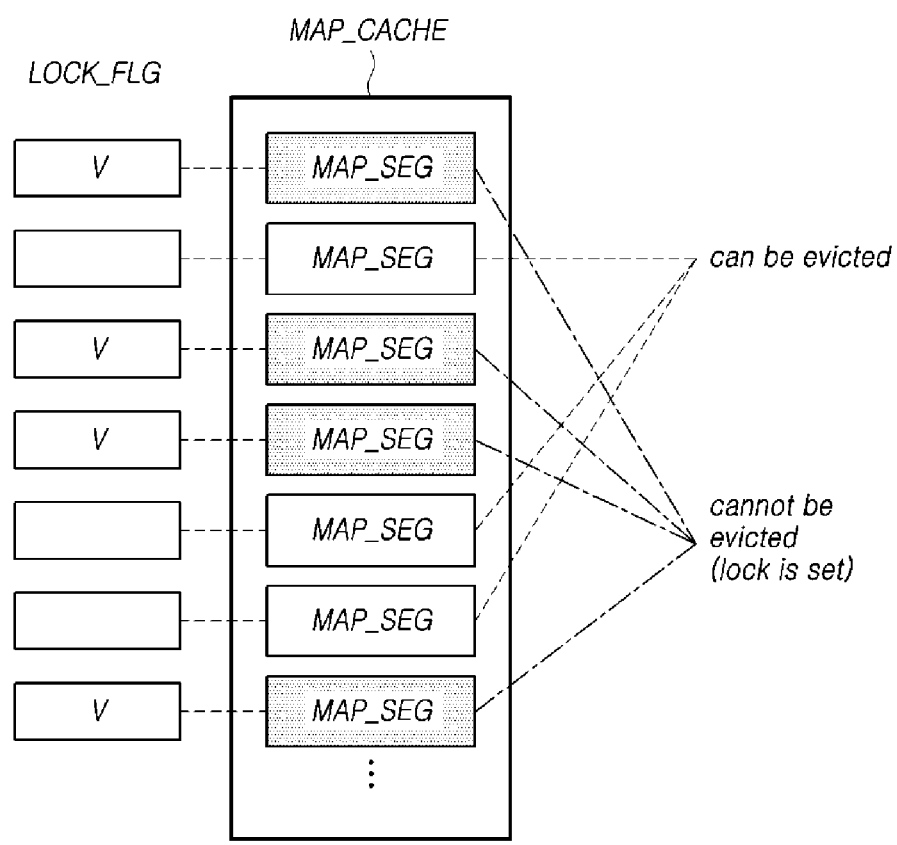
FIG. 6 is a diagram illustrating lock flags for map segments cached in a map cache.

FIG. 6 is a diagram illustrating lock flags LOCK_FLG for map segments MAP_SEG cached in a map cache MAP_CACHE.

Referring to FIG. 6, the map segments on which lock flags LOCK_FLG are set (i.e., marked by "V"), among the map segments MAP_SEG cached in the map cache MAP_CACHE, are not evicted from the map cache MAP_CACHE. On the other hand, the map segments on which lock flags LOCK_FLG are not set (i.e., not marked by "V"), among the map segments MAP_SEG cached in the map cache MAP_CACHE, may be evicted from the map cache MAP_CACHE.

That is, in the case where one or more of the map segments MAP_SEG in the map cache MAP_CACHE have to be evicted in order to secure an extra space in the map cache MAP_CACHE, the memory controller 120 may select the map segments, which are to be evicted, from among the map segments on which the lock flags LOCK_FLG are not set on the basis of a predetermined policy (e.g., least recently used (LRU)).

Hereinafter, the time at which the memory controller 120 of the memory system 100 selects the map segments on which locking is to be set from among the map segments MAP_SEG in the map cache MAP_CACHE is described in detail with reference to FIGS. 7 to 9.

Figure 7:
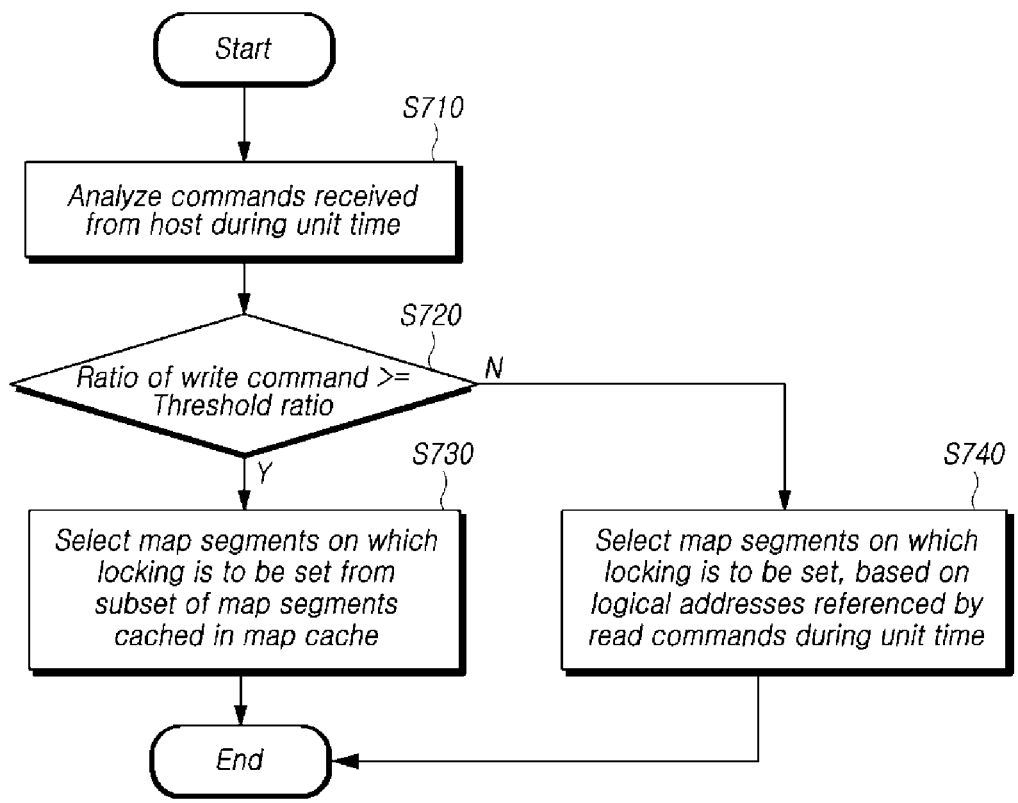
FIG. 7 is a flowchart illustrating an example in which a memory system selects map segments on which locking is to be set according to an embodiment of the present disclosure.

FIG. 7 is a flowchart illustrating an example in which the memory system 100 of FIG. 1 selects map segments on which locking is to be set according to an embodiment of the present disclosure.

Referring to FIG. 7, the memory controller 120 of the memory system 100 may analyze commands received from a host HOST during a set period of time (S710). The memory controller 120 may receive commands (e.g., read commands or write commands) from a host, and may determine workload on the basis of the received commands.

The memory controller 120 determines whether the ratio of the write commands to all commands received from the host during set period of time (e.g., 100 ms) is greater than or equal to a threshold ratio (S720).

The ratio of the write commands to all commands may be determined based on the numbers, i.e., the number of write commands received and the number of all commands received. For example, if the memory controller 120 receives 40 read commands and 60 write commands from the host during the set period of time, the ratio of the write commands to all commands received from the host during that time is 60/(40+60)=60%.

If the ratio of the write commands to all commands received is greater than or equal to the threshold ratio ("Y" in S720), the memory controller 120 may select map segments on which locking is to be set from the map segments MAP_SEG cached in the map cache MAP_CACHE (S730), which is a subset of all map segments.

On the other hand, if the ratio of the write commands to all commands is less than the threshold ratio ("N" in S720), the memory controller 120 may select map segments on which locking is to be set from the map segments MAP_SEG cached in the map cache MAP_CACHE on the basis of the logical addresses referenced by the read commands received from the host during the set period of time (S740).

Hereinafter, a specific example of step S740 is described with reference to FIGS. 8 and 9.

Figure 8:
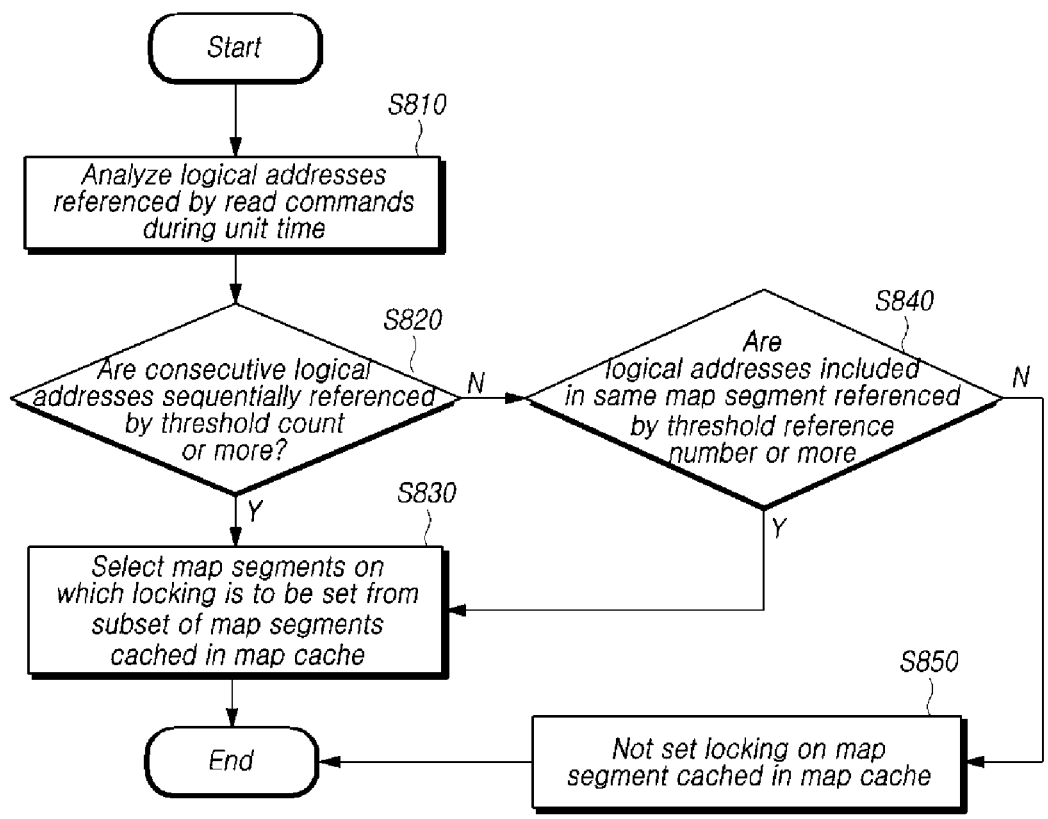
FIG. 8 is a flowchart illustrating an example of an operation in which a memory system selects map segments on which locking is to be set on the basis of logical addresses referenced by read commands according to an embodiment of the present disclosure.

FIG. 8 is a flowchart illustrating an example of an operation in which the memory system 100 of FIG. 1 selects map segments on which locking is to be set on the basis of logical addresses referenced by read commands according to an embodiment of the present disclosure.

Referring to FIG. 8, the memory controller 120 of the memory system 100 may analyze logical addresses referenced by the read commands received from the host during a set period of time (S810).

The memory controller 120 determines whether or not consecutive logical addresses are sequentially referenced at least a threshold number of times (e.g., ten) by the read commands during the set period of time (S820). For example, assuming that the threshold number is 10, the memory controller 120 may determine whether or not ten or more consecutive logical addresses (e.g., logical addresses 0 to 9, logical addresses 105 to 120, or logical addresses 512 to 522) are sequentially referenced by the read commands during the set period of time. Here, "referencing the consecutive logical addresses sequentially" denotes that the logical addresses are referenced in order of increasing value or in order of decreasing value.

If consecutive logical addresses are sequentially referenced at least a threshold number of times (e.g., ten) by the read commands during the set period of time ("Y" in S820), the memory controller 120 may select map segments on which locking is to be set from the map segments MAP_SEG cached in the map cache MAP_CACHE (S830).

On the other hand, if consecutive logical addresses are not sequentially referenced at least the threshold number of times (e.g., ten) by the read commands during the set period of time ("N" in S820), the memory controller 120 may determine whether or not logical addresses in the same map segment among the map segments MAP_SEG cached in the map cache MAP_CACHE are referenced at least a threshold reference number of times (e.g., ten times) (S840).

For example, in the case where one map segment includes mapping information corresponding to logical addresses 512 to 1023, if ten or more logical addresses between 512 and 1023 are referenced (for example, logical addresses 513, 515, 516, 530, 600, 610, 700, 850, 900, and 1020 are referenced) during the set period of time, the memory controller 120 may determine that the logical addresses in the same map segment among the map segments MAP_SEG cached in the map cache MAP_CACHE are referenced at least the threshold reference number of times.

If the logical addresses in the same map segment are referenced at least the threshold reference number of times (e.g., 10) ("Y" in S840), the memory controller 120 may select the map segments on which locking is to be set from the map segments MAP_SEG cached in the map cache MAP_CACHE (S830).

On the other hand, if the logical addresses in the same map segment are not referenced at least the threshold reference number of times ("N" in S840), the memory controller 120 does not set locking on the map segments MAP_SEG cached in the map cache MAP_CACHE (S850).

Figure 9:
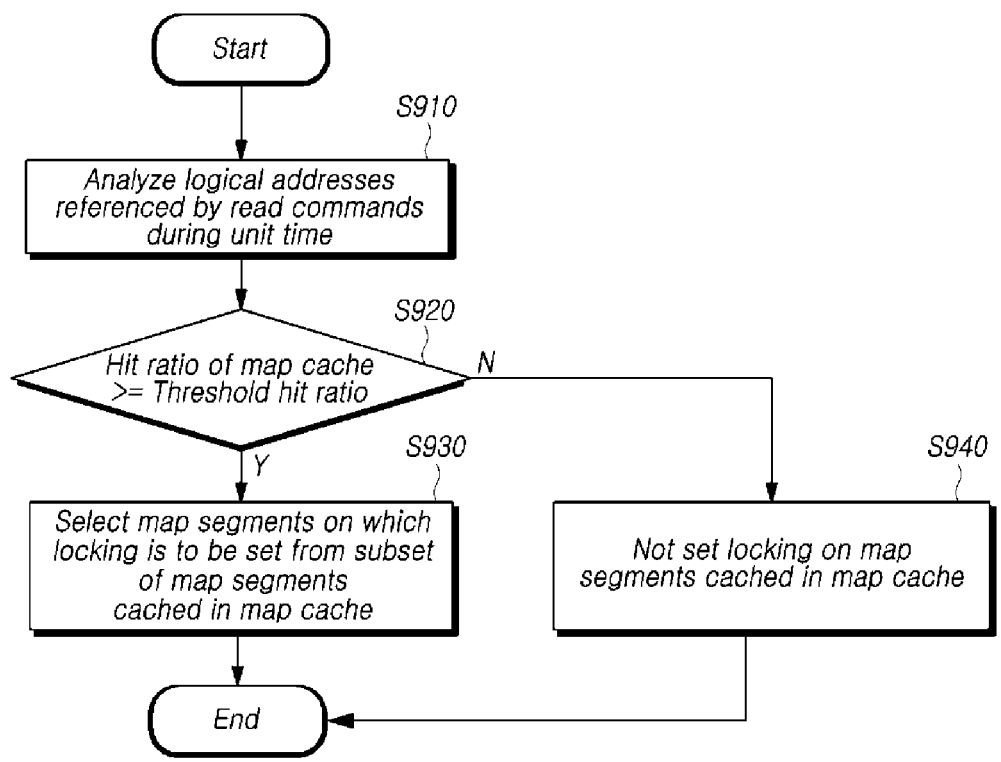
FIG. 9 is a flowchart illustrating another example in which a memory system selects map segments on which locking is

FIG. 9 is a flowchart illustrating another example in which the memory system 100 of FIG. 1 selects map segments on which locking is to be set on the basis of logical addresses referenced by read commands according to an embodiment of the present disclosure.

Referring to FIG. 9, the memory controller 120 of the memory system 100 may analyze logical addresses referenced by read commands received from a host during a set period of time (S910).

In addition, the memory controller 120 determines whether or not a hit ratio of the map cache MAP_CACHE by the read commands is greater than or equal to a threshold hit ratio (S920).

The "hit ratio" of the map cache MAP_CACHE by the read commands refers to the ratio of the number of times logical address values in the map segments cached in the map cache MAP_CACHE are referenced by the read commands to the number of times logical address values are referenced by the same.

For example, if the read commands reference a total of 5 logical addresses 100, 150, 200, 250, and 300, and if three logical addresses 150, 250, and 300 thereof are included in the map segments cached in the map cache MAP_CACHE, the hit ratio of the map cache MAP_CACHE is 3/5=60%.

If the hit ratio of the map cache MAP_CACHE by the read commands is greater than or equal to a threshold hit ratio ("Y" in S920), the memory controller 120 may select map segments on which locking is to be set from the map segments MAP_SEG cached in the map cache MAP_CACHE (S930).

On the other hand, if the hit ratio of the map cache MAP_CACHE by the read commands is less than the threshold hit ratio ("N" in S920), the memory controller 120 does not set locking on the map segments MAP_SEG cached in the map cache MAP_CACHE (S940).

Hereinafter, selection of the map segments on which locking is to be set from the map segments MAP_SEG cached in the map cache MAP_CACHE is described in detail.

Figure 10:
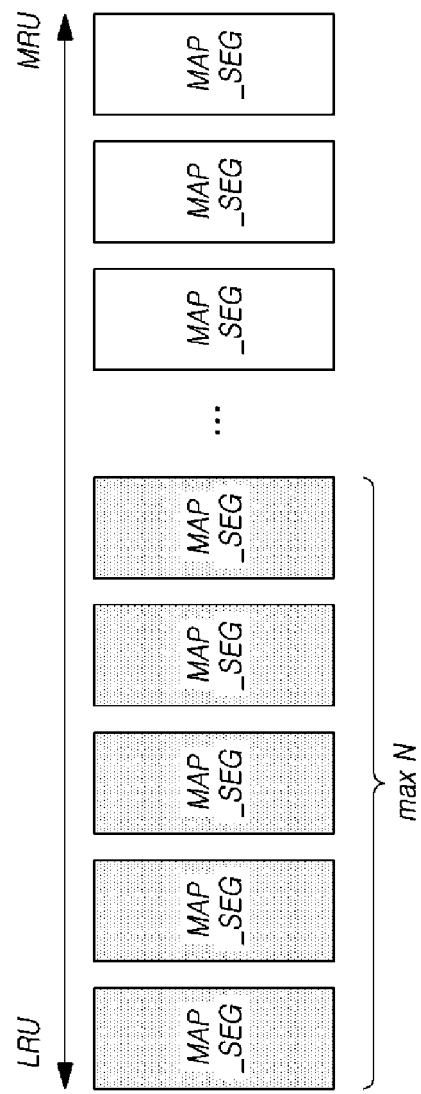
FIG. 10 is a diagram illustrating map segments on which locking is to be set, among map segments cached in a map cache.

FIG. 10 is a diagram illustrating map segments on which locking is to be set, among the map segments cached in a map cache MAP_CACHE.

In the illustrated example, the memory controller 120 of FIG. 1 may select up to N least recently used (LRU) map segments from the map segments MAP_SEG cached in the map cache MAP_CACHE as the map segments on which locking is to be set. Here, the "least recently used map segment" refers to the map segment last used (i.e., hit), which is the oldest among all used map segments. On the other hand, a "most recently used (MRU) map segment" refers to the last map segment used (i.e., hit), which is the most recent among all used map segments.

If the number of map segments MAP_SEG cached in the map cache MAP_CACHE is N or less, all of the map segments MAP_SEG cached in the map cache MAP_CACHE may be selected as the map segments on which locking is to be set. For example, if N=20 and the number of map segments cached in the map cache MAP_CACHE is 15, all of the 15 map segments are selected as the map segments on which locking is to be set.

On the other hand, if the number of map segments MAP_SEG cached in the map cache MAP_CACHE exceeds N, N least recently used map segments may be selected as the map segments on which locking is to be set from the map segments MAP_SEG cached in the map cache MAP_CACHE. For example, if N=20 and the number of map segments cached in the map cache MAP_CACHE is 25, 20 least recently used map segments among the 25 map segments are selected as the map segments on which locking is to be set.

A method of changing a value N, which is the maximum number of map segments on which locking is to be set, among the map segments MAP_SEG cached in the map cache MAP_CACHE, is described with reference to FIGS. 11 and 12.

Figure 11:
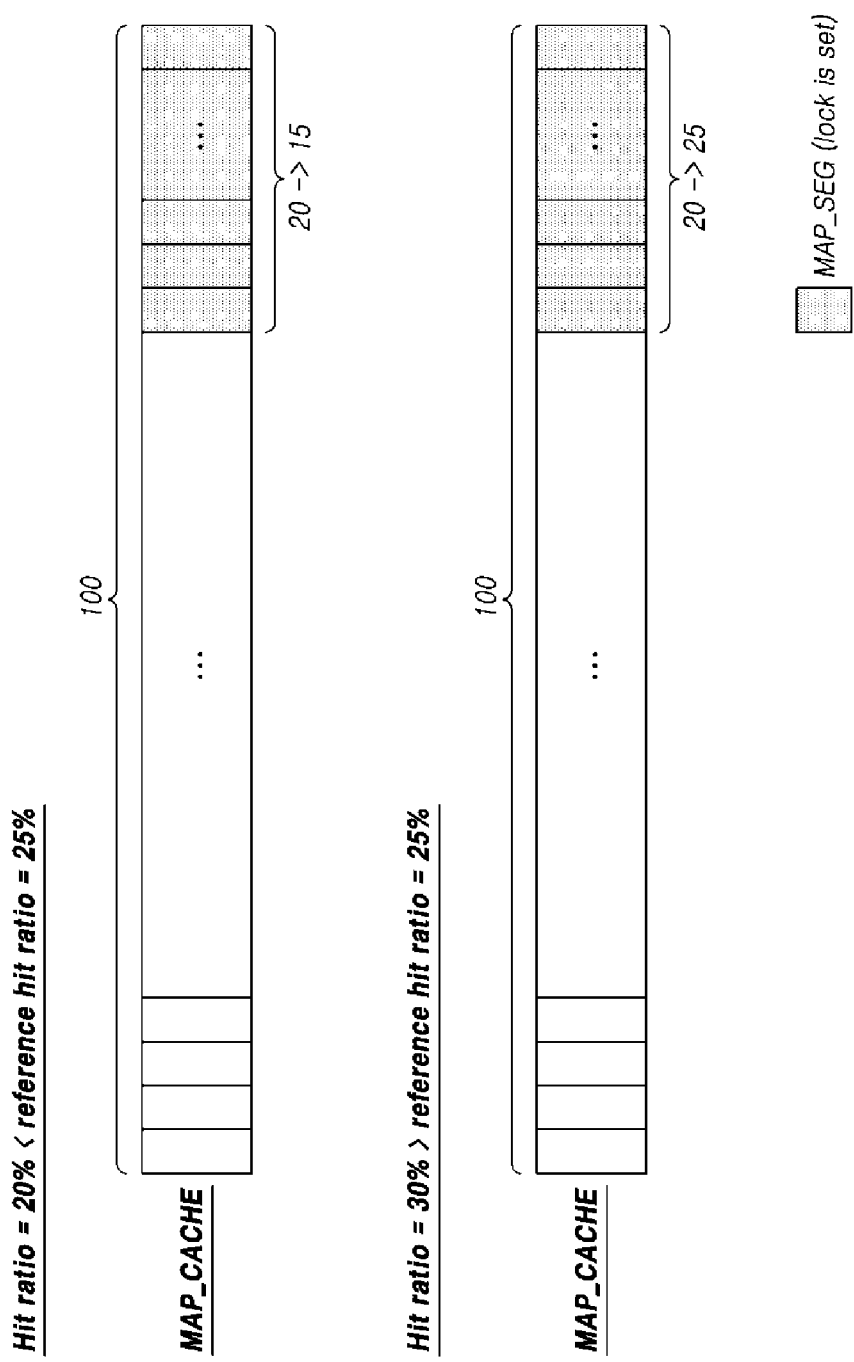
FIG. 11 is a diagram illustrating an operation in which the number of map segments on which locking is set changes depending on a change in the hit ratio of a map segment.

FIG. 11 is a diagram illustrating an operation in which the number of map segments on which locking is set changes depending on a change in the hit ratio of a map segment.

Referring to FIG. 11, the maximum number N of map segments on which locking is to be set, among the map segments MAP_SEG cached in the map cache MAP_CACHE, may be changed depending on a hit ratio and a reference hit ratio of the map cache MAP_CACHE. The "reference hit ratio" refers to a hit ratio for the map cache MAP_CACHE to attain a set level of performance or higher, and may be set by the memory controller 120.

In this case, the hit ratio of the map cache MAP_CACHE may be determined to be the ratio of the number of pieces of mapping information hit (i.e., that is, successfully retrieved) from the map cache MAP_CACHE to the total number of times the mapping information is retrieved from the map cache MAP_CACHE during a set time (e.g., 1 second). For example, if 100 pieces of mapping information are retrieved during the set time, and if 40 pieces of mapping information thereof are hit and 60 pieces of mapping information thereof are missed, the hit ratio C is determined to be 40/100=40%.

In the illustrated example of FIG. 11, it is assumed that the map cache MAP_CACHE may cache 100 map segments MAP_SEG, that locking is set on 20 map segments thereof, and that the reference hit ratio is 25%.

For example, it is assumed that the hit ratio of the map cache MAP_CACHE is 30%, which is higher than the reference hit ratio of 25%. In this case, even if locking is further set on the map segments MAP_SEG cached in the map cache MAP_CACHE, caching performance may be ensured up to the reference hit ratio. Accordingly, the memory controller 120 may increase the maximum number of map segments on which locking is to be set from 20 to 25.

As another example, it is assumed that the hit ratio of the map cache MAP_CACHE is 20%, which is lower than the reference hit ratio of 25%. In this case, in order to increase the hit ratio of the map cache MAP_CACHE close to the reference hit ratio, additional area to be used for caching is required, so the area occupied by the map segments on which locking is set must be used for caching. Accordingly, the memory controller 120 may reduce the maximum number of map segments on which locking is to be set from 20 to 15.

As described above, the memory controller 120 may set the maximum number of the map segments on which locking is to be set within range of a reference hit ratio that ensures a specific level of caching performance or more for the mapping table, thereby optimizing the update performance for the mapping table.

The reference hit ratio described in FIG. 11 may be changed depending on the number of map segments on which locking is set, among the map segments MAP_SEG cached in the map cache MAP_CACHE.

Figure 12:
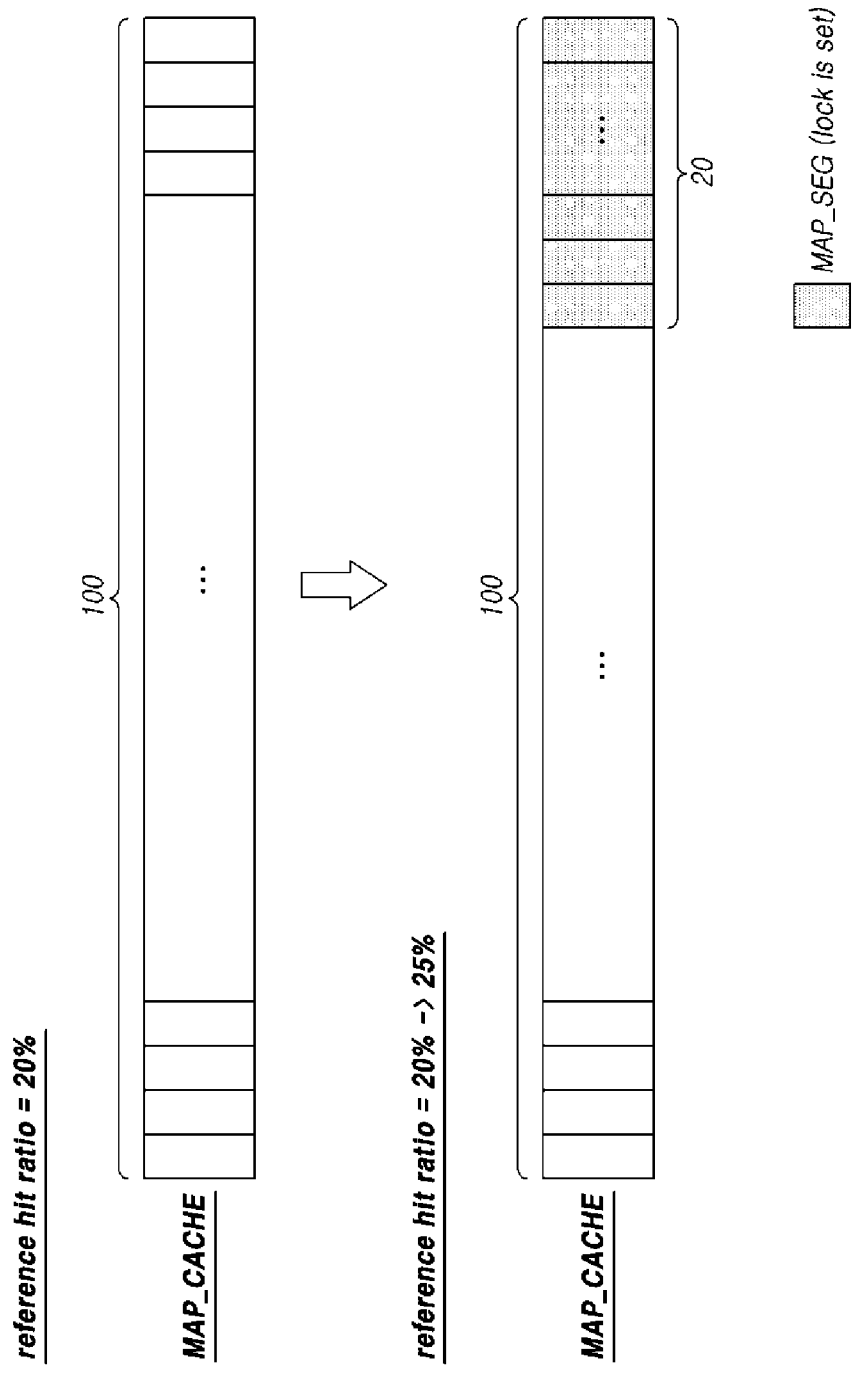
FIG. 12 is a diagram illustrating a change in the reference hit ratio depending on the number of map segments on which locking is set.

FIG. 12 is a diagram illustrating a change in the reference hit ratio depending on the number of map segments on which locking is set.

In the illustrated example of FIG. 12, it is assumed that the initial reference hit ratio is set to 20% and that up to 100 map segments MAP_SEG may be cached in the map cache MAP_CACHE.

In this case, assuming that locking is set on 20 map segments among the map segments MAP_SEG cached in the map cache MAP_CACHE, the reference hit ratio may be changed from 20% to 25%. This is due to the fact that the caching performance of the map cache MAP_CACHE, when the size used in caching in the map cache MAP_CACHE is 100 and the hit ratio is 20%, is the same as the caching performance of the map cache MAP_CACHE when the size used in caching in the map cache MAP_CACHE is 80 (=100−20) and the hit ratio is 25%.

As described above, if the number of map segments on which locking is set, among the map segments MAP_SEG cached in the map cache MAP_CACHE, increases, the size used for caching in the map cache MAP_CACHE decreases. In addition, in order to achieve the same caching performance when the size used in caching is reduced, the reference hit ratio of the map cache MAP_CACHE is required to be increased. Accordingly, the reference hit ratio may be changed in proportion to the number of map segments on which locking is set, among the map segments MAP_SEG cached in the map cache MAP_CACHE.

The operation of setting locking on the map segments MAP_SEG cached in the map cache MAP_CACHE, which is a subset of all map segments, has been described in the above embodiments. Hereinafter, the operation of resetting the set locking is described.

Figure 13:
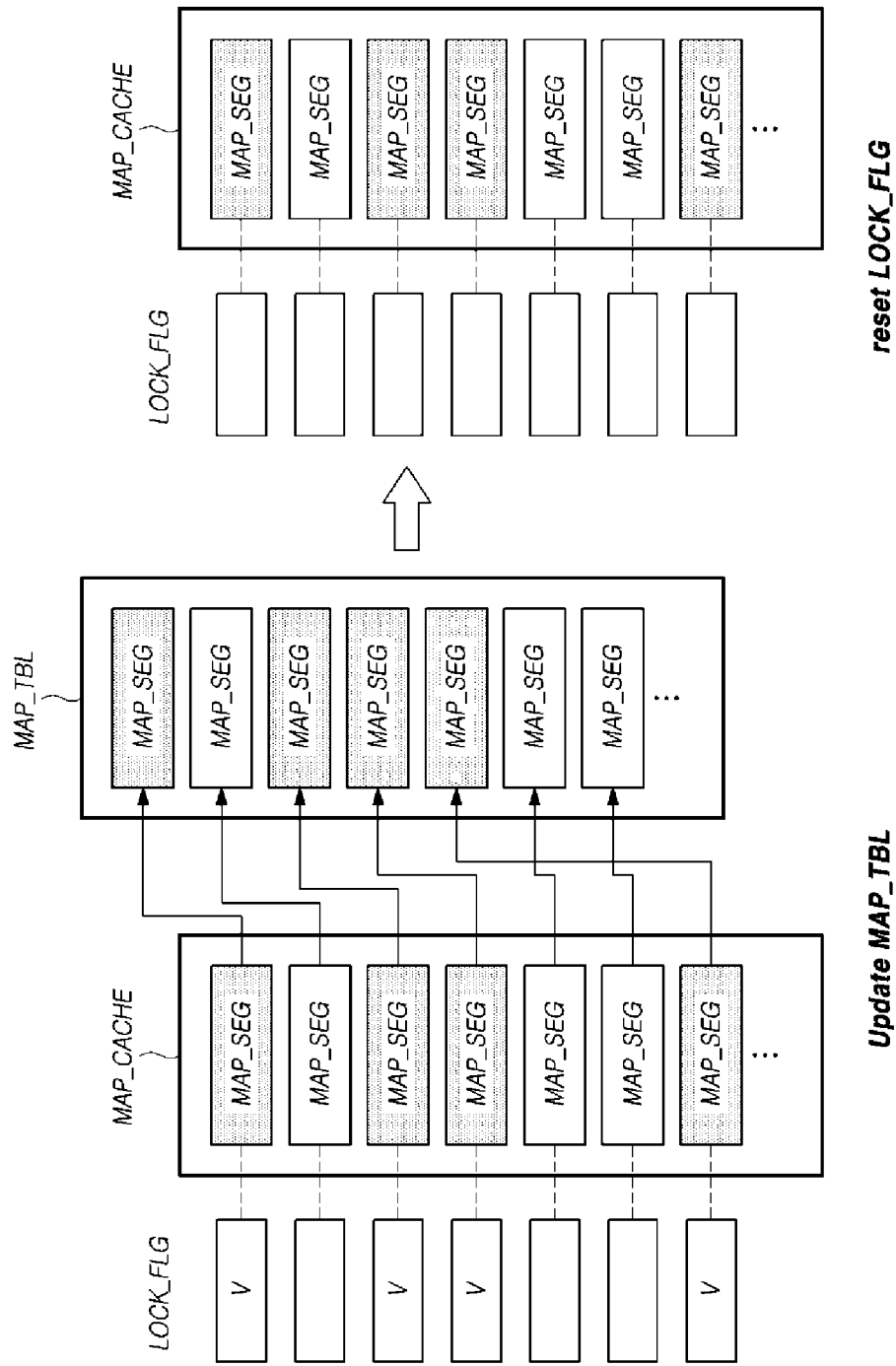
FIG. 13 is a diagram illustrating an example of an operation in which a memory system resets locking according to an embodiment of the present disclosure.

FIG. 13 is a diagram illustrating an example of an operation in which the memory system 100 of FIG. 1 resets locking according to an embodiment of the present disclosure.

Referring to FIG. 13, the memory controller 120 of the memory system 100 may reset lock flags LOCK_FLG of the map segments on which locking is set (e.g., marked by "V") after updating the mapping table MAP_TBL with the map segments on which locking is set, among the map segments MAP_SEG cached in the map cache MAP_CACHE. That is, the lock flag LOCK_FLG may be reset after the map-update of the mapping table MAP_TBL is completed.

As described above, setting locking on the map segments MAP_SEG cached in the map cache MAP_CACHE aims to prevent the inefficiency of reloading the evicted map segments in the process of map-updating of the mapping table MAP_TBL. If the map-update of the mapping table MAP_TBL is completed, the map segments no longer need to be cached in the map cache MAP_CACHE. Accordingly, the memory controller 120 may reset the lock flags LOCK_FLG for the map segments on which locking is set.

Figure 14:
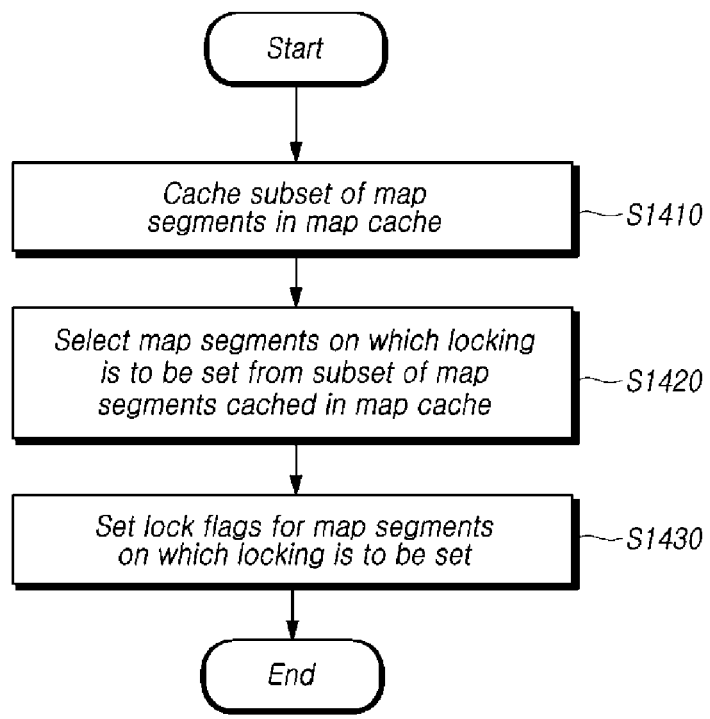
FIG. 14 is a flowchart illustrating an operation method of a memory system according to an embodiment of the present disclosure.

FIG. 14 is a flowchart illustrating an operation method of the memory system 100 of FIG. 1 according to an embodiment of the present disclosure.

Referring to FIG. 14, the operation method of the memory system 100 may include a step of caching a subset of map segments MAP_SEG in a mapping table MAP_TBL, which indicates mapping information between logical addresses and physical addresses, in the map cache MAP_CACHE (S1410).

In addition, the operation method of the memory system 100 may include a step of selecting map segments on which locking is to be set from the map segments MAP_SEG cached in the map cache MAP_CACHE on the basis of information on a command received from a host during a unit time (S1420).

For example, if the ratio of write commands to all commands received from the host during a set period of time is greater than or equal to a threshold ratio, the map segments on which locking is to be set may be selected from the map segments MAP_SEG cached in the map cache MAP_CACHE.

As another example, if the ratio of write commands to all commands during the set period of time is less than the threshold ratio, map segments on which locking is to be set may be selected from the map segments MAP_SEG cached in the map cache MAP_CACHE on the basis of the logical addresses referenced by read commands received from the host during the set period of time.

In this case, 1) if consecutive logical addresses are sequentially referenced a threshold count or more by the read commands, or 2) if logical addresses in the same map segment, among the map segments MAP_SEG cached in the map cache MAP_CACHE, are referenced a threshold reference number of times or more by the read commands, the map segments on which locking is to be set may be selected from the map segments MAP_SEG cached in the map cache MAP_CACHE, which is a subset of all map segments. Alternatively, if a hit ratio of the map cache MAP_CACHE by the read commands during the set period of time is greater than or equal to a threshold hit ratio, the map segments on which locking is to be set may be selected from the map segments MAP_SEG cached in the map cache MAP_CACHE.

In addition, the operation method of the memory system 100 may include a step of setting lock flags LOCK_FLG for the map segments on which locking is to be set (S1430). The lock flags LOCK_FLG may be managed using bitmaps.

The above-described operations of the memory controller 120 may be controlled by the control circuit 123, and the processor 124 may be performed in a manner in which various operations of the memory controller 120 execute (drive) programmed firmware.

Figure 15:
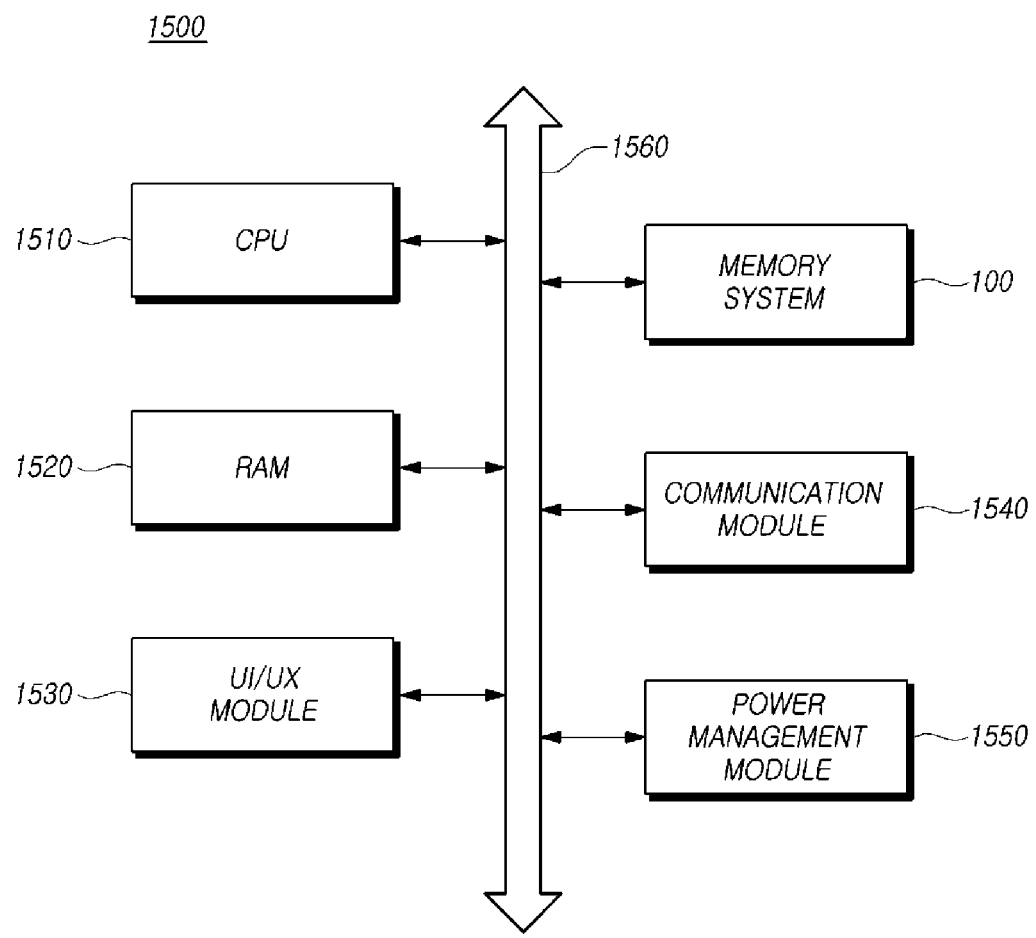
FIG. 15 is a diagram illustrating the configuration of a computing system according to an embodiment of the present disclosure.

FIG. 15 is a diagram illustrating a configuration of a computing system 1500 according to an embodiment of the present disclosure.

Referring to FIG. 15, the computing system 1500 may include: a memory system 100 electrically connected to a system bus 1560; a central processing unit (CPU) 1510 configured to control the overall operation of the computing system 1500; a random access memory (RAM) 1520 configured to store data and information related to operations of the computing system 1500; a user interface/user experience (UI/UX) module 1530 configured to provide the user with a user environment; a communication module 1540 configured to communicate with an external device in a wired and/or wireless manner; and a power management module 1550 configured to manage power used by the computing system 1500.

The computing system 1500 may be a personal computer (PC) or may include a mobile terminal such as a smartphone, a tablet or any of various other electronic devices.

The computing system 1500 may further include a battery for supplying an operating voltage, an application chipset, a graphic-related module, a camera image processor, and a dynamic random access memory (DRAM). Of course, the computing system 1500 may include other elements as a person skilled in the art will understand.

The memory system 100 may include a device configured to store data in a magnetic disk such as a hard disk drive (HDD), and/or a device configured to store data in a non-volatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and/or the like. In addition, the memory system 100 may be implemented as any of various types of storage devices mounted inside any of various electronic devices.

According to embodiments of the present disclosure described above, operation delay time of the memory system may be minimized. In addition, according to an embodiment of the present disclosure, overhead occurring in the process of calling a specific function may be minimized. Although various embodiments of the present disclosure have been illustrated and described, those skilled in the art will appreciate that various modifications, additions and substitutions are possible, without departing from the scope and spirit of the disclosure as set forth in the accompanying claims. That is, the present disclosure encompasses all modifications and variations of any of the disclosed embodiments that fall within the scope of the claims.

What is claimed is:

1. A memory system comprising:
a memory device;
and a memory controller coupled to the memory device and configured to:
cache map segments in a map cache, wherein the map segments are a subset of all map segments in a mapping table indicating mapping information between logical addresses and physical addresses;
select map segments, on which locking is to be set, based on information on all commands received from a host during a set period of time, wherein the map segments are selected from the map segments cached in the map cache, and the map segments, on which locking is to be set, are not to be evicted from the map cache;
and set lock flags of the map segments on which locking is to be set, wherein the memory controller is configured to select the map segments, on which locking is to be set, from the map segments in the map cache, when a ratio of write commands to all the commands received from the host during the set period of time is greater than or equal to a threshold ratio.

2. The memory system of claim 1, wherein the memory controller configured to select the map segments, on which locking is to be set, based on the information on all the commands received from the host during the set period of time further comprises the memory controller configured to, when the ratio of write commands to all the commands received from the host during the set period of time is less than the threshold ratio, select, based on logical addresses referenced by read commands received from the host during the set period of time, the map segments, on which locking is to be set, from the map segments in the map cache.

3. The memory system of claim 2, wherein the memory controller configured to select, based on the logical address referenced by the read commands received from the host during the set period of time, the map segments, on which locking is to be set, from the map segments in the map cache further comprises the memory controller configured to, when i) consecutive logical addresses are sequentially referenced, by the read commands, a threshold count or more, or ii) when logical addresses in same map segment, among the map segments in the map cache, are referenced, by the read commands, a threshold reference number of times or more, select the map segments on which locking is to be set from the map segments in the map cache.

4. The memory system of claim 2, wherein the memory controller configured to select, based on the logical address referenced by the read commands received from the host during the set period of time, the map segments, on which locking is to be set, from the map segments in the map cache further comprises the memory controller configured to, when a hit ratio of the map cache by the read commands is greater than or equal to a threshold hit ratio, select the map segments on which locking is to be set, from the map segments in the map cache.

5. The memory system of claim 1, wherein the memory controller is configured to select up to N least recently used map segments from the map segments in the map cache as the map segments on which locking is to be set.

6. The memory system of claim 5, wherein the value N is changed depending on a hit ratio and a reference hit ratio of the map cache.

7. The memory system of claim 6, wherein the reference hit ratio is changed in proportion to a number of the map segments on which locking is set.

8. The memory system of claim 1, wherein the memory controller is configured to reset the lock flags after updating the mapping table with the map segments on which locking is set.

9. A memory controller comprising:
a memory interface configured to communicate with a memory device;
a control circuit coupled to the memory device and configured to:
cache map segments in a map cache, wherein the map segments are a subset of all map segments in a mapping table indicating mapping information between logical addresses and physical addresses;
select map segments, on which locking is to be set, based on information on all commands received from a host during a set period of time, wherein the map segments are selected from the map segments cached in the map cache, and the map segments, on which locking is to be set, are not to be evicted from the map cache;
and set lock flags of the map segments on which locking is to be set, wherein the control circuit configured to select the map segments, on which locking is to be set, from the map segments in the map cache, when a ratio of write commands to all the commands received from the host during the set period of time is greater than or equal to a threshold ratio.

10. The memory controller of claim 9, wherein the control circuit configured to select the map segments, on which locking is to be set, based on the information on all the commands received from the host during the set period of time further comprises the control circuit configured to, when the ratio of write commands to all the commands received from the host during the set period of time is less than the threshold ratio, select, based on logical addresses referenced by read commands received from the host during the set period of time, the map segments, on which locking is to be set, from the subset of map segments in the map cache.

11. The memory controller of claim 10, wherein the control circuit configured to select, based on the logical address referenced by the read commands received from the host during the set period of time, the map segments, on which locking is to be set, from the map segments in the map cache further comprises the control circuit configured to, when i) consecutive logical addresses are sequentially referenced, by the read commands, a threshold count or more, ii) or when logical addresses in same map segment, among the map segments in the map cache, are referenced, by the read commands, a threshold reference number of times or more, select the map segments on which locking is to be set from the map segments in the map cache.

12. The memory controller of claim 10, wherein the control circuit configured to select, based on the logical address referenced by the read commands received from the host during the set period of time, the map segments, on which locking is to be set, from the map segments in the map cache further comprises the control circuit configured to, when a hit ratio of the map cache by the read commands is greater than or equal to a threshold hit ratio, select the map segments, on which locking is to be set, from the map segments in the map cache.

13. The memory controller of claim 9, wherein the control circuit is configured to select up to N least recently used map segments from the map segments in the map cache as the map segments on which locking is to be set.

14. An operation method of a memory system, the method comprising:
caching map segments in a map cache, wherein the map segments are a subset of map segments in a mapping table indicating mapping information between logical addresses and physical addresses;
selecting map segments, on which locking is to be set, based on information on all commands received from a host during a set period of time, wherein the map segments are selected from the map segments cached in the map cache, and the map segments, on which locking is to be set, are not to be evicted from the map cache;
setting lock flags of the map segments on which locking is to be set;
and determining that a ratio of write commands to all the commands is greater than or equal to a threshold ratio, wherein in response to the ratio of write commands to all the commands being greater than or equal to the threshold ratio, selecting the map segments, on which locking is to be set, from the map segments in the map cache.

15. The method of claim 14, wherein the selecting map segments, on which locking is to be set, based on the information on all the commands received from the host during the set period of time further comprises, when the ratio of write commands to all the commands received from the host during the set period of time is less than the threshold ratio, selecting, based on logical addresses referenced by read commands received from the host during the set period of time, the map segments on which locking is to be set, from the map segments in the map cache.

16. The method of claim 15, wherein the selecting, based on the logical address referenced by the read commands received from the host during the set period of time, map segments, on which locking is to be set, from the map segments in the map cache further comprises, when i) consecutive logical addresses are sequentially referenced, by the read commands, a threshold count or more, or ii) when logical addresses in same map segment, among the map segments in the map cache, are referenced, by the read commands, a threshold reference number of times or more, selecting the map segments on which locking is to be set from the map segments in the map cache.

17. The method of claim 15, wherein the selecting, based on the logical address referenced by the read commands received from the host during the set period of time, map segments, on which locking is to be set, from the map segments in the map cache further comprises, when a hit ratio of the map cache by the read commands is greater than or equal to a threshold hit ratio, selecting the map segments, on which locking is to be set from the map segments in the map cache.

\* \* \* \* \*